US011754396B2

(12) United States Patent
Takizawa (10) Patent No.: US 11,754,396 B2
(45) Date of Patent: Sep. 12, 2023

(54) GYRO SENSOR, ELECTRONIC DEVICE, AND VEHICLE

(71) Applicant: Seiko Epson Corporation, Tokyo (JP)

(72) Inventor: Teruo Takizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/504,919

(22) Filed: Oct. 19, 2021

(65) Prior Publication Data

US 2022/0034658 A1 Feb. 3, 2022

Related U.S. Application Data

(63) Continuation of application No. 16/943,102, filed on Jul. 30, 2020, now Pat. No. 11,187,529.

(30) Foreign Application Priority Data

Jul. 31, 2019 (JP) ................................. 2019-140790

(51) Int. Cl.
*G01C 19/5712* (2012.01)
(52) U.S. Cl.
CPC ................. *G01C 19/5712* (2013.01)
(58) Field of Classification Search
CPC ............................ G01C 19/5712; G01C 19/56
See application file for complete search history.

(56) References Cited

U.S. PATENT DOCUMENTS

| 5,983,721 A | 11/1999 | Sulzberger et al. |
| 6,571,630 B1 | 6/2003 | Weinberg et al. |
| 7,360,422 B2 * | 4/2008 | Madni .................... G01C 19/56 |
| | | 73/504.16 |
| 8,368,476 B2 | 2/2013 | Mikami |
| 8,714,013 B2 | 5/2014 | Watanabe et al. |
| 8,796,789 B2 | 8/2014 | Uto et al. |
| 8,833,164 B2 * | 9/2014 | Coronato ........... G01C 19/5747 |
| | | 73/504.14 |
| 8,919,200 B2 | 12/2014 | Watanabe |
| 9,322,650 B2 | 4/2016 | Watanabe et al. |
| 9,383,383 B2 | 7/2016 | Tanaka |
| 9,470,711 B2 | 10/2016 | Tanaka |
| 9,891,052 B2 | 2/2018 | Rinkio |

(Continued)

FOREIGN PATENT DOCUMENTS

| CN | 103376101 A | 10/2013 |
| CN | 104655875 A | 5/2015 |

(Continued)

*Primary Examiner* — David J Bolduc
(74) *Attorney, Agent, or Firm* — Harness, Dickey & Pierce, P.L.C.

(57) ABSTRACT

A gyro sensor includes a substrate, a fixed section fixed to the substrate, a driving section configured to perform driving along an X axis parallel to a principal plane of the substrate, a mass section coupled to the driving section and displaced along the X axis, a detecting section coupled to the mass section, capable of turning around a Z axis crossing the X axis, and capable of being displaced along the Z axis by a Coriolis force acting on a turning motion horizontal to the substrate, and an elastic section coupling the detecting section and the fixed section. The fixed section is disposed between the center of gravity of the detecting section and the mass section in a plan view.

12 Claims, 7 Drawing Sheets

(56) References Cited

U.S. PATENT DOCUMENTS

| | | |
|---|---|---|
| 9,958,271 B2 | 5/2018 | Anac et al. |
| 10,480,942 B2 * | 11/2019 | Gattere .................. H01G 5/011 |
| 10,520,314 B2 | 12/2019 | Giner |
| 10,823,569 B1 | 11/2020 | Shao |
| 10,914,584 B2 | 2/2021 | Senkal et al. |
| 2003/0155622 A1 | 8/2003 | Ishibashi et al. |
| 2004/0025591 A1 | 2/2004 | Yoshikawa et al. |
| 2006/0032310 A1 | 2/2006 | Merassi et al. |
| 2006/0125347 A1 | 6/2006 | Yoda et al. |
| 2006/0272409 A1 | 12/2006 | Acar et al. |
| 2006/0272410 A1 | 12/2006 | Mao et al. |
| 2006/0272411 A1 | 12/2006 | Acar et al. |
| 2007/0025659 A1 | 2/2007 | Yoda |
| 2007/0165096 A1 | 7/2007 | Nakamura |
| 2007/0214883 A1 | 9/2007 | Durante et al. |
| 2008/0092652 A1 | 4/2008 | Acar |
| 2008/0306581 A1 | 12/2008 | Berglund et al. |
| 2009/0064780 A1 | 3/2009 | Coronato et al. |
| 2009/0140356 A1 | 6/2009 | Yazdi |
| 2009/0260437 A1 | 10/2009 | Blomqvist |
| 2009/0314085 A1 | 12/2009 | Stahl et al. |
| 2009/0320596 A1 | 12/2009 | Classen et al. |
| 2010/0024549 A1 | 2/2010 | Wang et al. |
| 2010/0037690 A1 | 2/2010 | Gunthner et al. |
| 2010/0072563 A1 | 3/2010 | Sato et al. |
| 2010/0083756 A1 | 4/2010 | Merz et al. |
| 2010/0154541 A1 | 6/2010 | Cazzaniga et al. |
| 2010/0186507 A1 | 7/2010 | Gunthner et al. |
| 2010/0212423 A1 | 8/2010 | Rehle |
| 2010/0236327 A1 | 9/2010 | Mao |
| 2010/0263446 A1 | 10/2010 | Tamura et al. |
| 2011/0023604 A1 | 2/2011 | Cazzaniga et al. |
| 2011/0094301 A1 | 4/2011 | Rocchi |
| 2011/0265568 A1 | 11/2011 | Stephanou et al. |
| 2011/0270569 A1 * | 11/2011 | Stephanou .............. G01C 25/00 73/514.32 |
| 2011/0296913 A1 | 12/2011 | Ohms et al. |
| 2012/0017678 A1 | 1/2012 | Rocchi et al. |
| 2012/0210788 A1 | 8/2012 | Gunther et al. |
| 2013/0167636 A1 | 7/2013 | Coronato et al. |
| 2013/0180334 A1 | 7/2013 | Coronato et al. |
| 2013/0192365 A1 * | 8/2013 | Zhuang .............. G01C 19/5733 73/504.12 |
| 2013/0213134 A1 * | 8/2013 | Mao ........................ G01C 19/56 73/504.14 |
| 2013/0233048 A1 | 9/2013 | Anac et al. |
| 2013/0239679 A1 | 9/2013 | Kornilovich |
| 2013/0276536 A1 | 10/2013 | Kanemoto |
| 2013/0283908 A1 | 10/2013 | Geen et al. |
| 2014/0060184 A1 | 3/2014 | Walther |
| 2014/0182375 A1 | 7/2014 | Kim et al. |
| 2014/0373627 A1 | 12/2014 | Pruetz |
| 2015/0033852 A1 | 2/2015 | Kim et al. |
| 2015/0059473 A1 | 3/2015 | Jia |
| 2015/0143904 A1 | 5/2015 | Takizawa |
| 2015/0185012 A1 | 7/2015 | Acar |
| 2015/0211853 A1 | 7/2015 | Anac et al. |
| 2015/0316581 A1 | 11/2015 | Liukku et al. |
| 2016/0040990 A1 * | 2/2016 | Heller .................... G01C 19/56 73/504.12 |
| 2016/0084654 A1 | 3/2016 | Senkal et al. |
| 2016/0187135 A1 | 6/2016 | Yasumoto |
| 2016/0231115 A1 | 8/2016 | Piirainen |
| 2016/0334215 A1 | 11/2016 | Kato |
| 2017/0010300 A1 | 1/2017 | Kigure et al. |
| 2017/0261322 A1 | 9/2017 | Gattere et al. |
| 2017/0284804 A1 | 10/2017 | Gattere et al. |
| 2017/0343351 A1 | 11/2017 | Tormalehto |
| 2018/0031601 A1 | 2/2018 | Anac et al. |
| 2018/0031602 A1 | 2/2018 | Huang et al. |
| 2018/0031603 A1 * | 2/2018 | Huang .................... G01P 15/14 |
| 2018/0112982 A1 | 4/2018 | Takizawa et al. |
| 2018/0216935 A1 * | 8/2018 | Senkal ............... G01C 19/5762 |
| 2018/0238689 A1 * | 8/2018 | Ruohio ................. G01P 15/125 |
| 2018/0245920 A1 * | 8/2018 | Laghi ................. G01C 19/5712 |
| 2018/0340775 A1 | 11/2018 | Kuisma |
| 2018/0342667 A1 | 11/2018 | Kuisma |
| 2019/0162538 A1 * | 5/2019 | Thompson ......... G01C 19/5783 |
| 2019/0187171 A1 * | 6/2019 | Takizawa ................ G01P 15/14 |
| 2019/0383612 A1 * | 12/2019 | Geisberger ......... G01C 19/5747 |
| 2020/0124418 A1 | 4/2020 | Blomqvist et al. |
| 2020/0200533 A1 | 6/2020 | Sasaki et al. |

FOREIGN PATENT DOCUMENTS

| | | |
|---|---|---|
| JP | 2002-540406 A | 11/2002 |
| JP | 2005-241500 A | 9/2005 |
| JP | 2016-095224 A | 5/2016 |
| JP | 2017-211386 A | 11/2017 |
| JP | 2018-072091 A | 5/2018 |
| JP | 2018-185188 A | 11/2018 |
| JP | 2019-117099 A | 7/2019 |

* cited by examiner

GYRO SENSOR, ELECTRONIC DEVICE, AND VEHICLE

CROSS-REFERENCE TO RELATED APPLICATIONS

This application is a continuation of U.S. patent application Ser. No. 16/943,102 filed Jul. 30, 2020, which claims priority to Japanese Patent Application No. 2019-140790, filed Jul. 31, 2019, all of which are hereby expressly incorporated by reference herein in their entireties.

BACKGROUND

1. Technical Field

The present disclosure relates to a gyro sensor, an electronic device, and a vehicle.

2. Related Art

In recent years, a gyroscope or a gyro sensor including a gyro sensor element manufactured by a silicon MEMS (Micro Electro Mechanical System) technique has been developed.

As such a gyroscope, for example, JP-A-2017-211386 (Patent Literature 1) discloses a gyroscope in which a driving actuator located in the center drives two mass elements coupled to both sides of the driving actuator and causes the two mass elements to perform a turning motion to detect angular velocity around an axis in a driving direction of the driving actuator. In this gyroscope, one end portions of the mass elements are coupled to the driving actuator and the other end portions are coupled to, via elastic springs, a fixed section fixed to a substrate. The elastic springs allow an in-plane turning motion centering on the fixed section and, at the same time, have a function of a torsion spring. Therefore, when a rotating motion is applied to the mass elements around the axis in the driving direction of the driving actuator while the mass elements are performing the in-plane turning motion with the driving actuator, a Coriolis force is applied to the mass elements according to speed and a displacement amount of the in-plane turning motion. The Coriolis force acts in a direction of twisting the elastic springs and displaces the two mass elements in opposite phases. It is possible to detect angular velocity around the axis in the driving direction of the driving actuator by differentially detecting the displacement amount with detection electrodes disposed on the substrate.

However, among gyro sensors described in Patent Literature 1, in a gyro sensor that applies rotary drive vibration, since the elastic springs extending from the fixed section extend in the direction on the driving actuator side, a rotation radius of the mass elements is short. Accordingly, the displacement amount of the in-plane turning motion of the mass elements involved in the driving of the driving actuator decreases. Even if the rotating motion is applied around the axis in the driving direction of the driving actuator, a displacement amount to the detection electrode side of the mass elements decreases and detection sensitivity is deteriorated.

SUMMARY

A gyro sensor includes: a substrate; a fixed section fixed to the substrate; a mass section displaced along a first axis parallel to a principal plane of the substrate; a driving section configured to drive the mass section along the first axis; a detecting section coupled to the mass section, capable of turning around a second axis crossing the first axis, and capable of being displaced along the second axis by a Coriolis force acting on a turning motion horizontal to the substrate; and an elastic section coupling the detecting section and the fixed section. The fixed section is disposed between a center of gravity of the detecting section and the mass section in a plan view.

In the gyro sensor, the fixed section may be disposed between the elastic section and the mass section.

In the gyro sensor, a joining section extending along a third axis, which crosses the first axis and the second axis, from the detecting section and joining the elastic section and the detecting section may be disposed between the center of gravity of the detecting section and the mass section.

In the gyro sensor, the detecting section may include a groove disposed in a position closer to the elastic section than an end portion at an opposite side of the mass section side of the detecting section.

In the gyro sensor, the groove may be disposed in a position where a center in the first axis direction of the groove does not overlap an extended line along the third axis passing a center in the first axis direction of the joining section.

A gyro sensor includes: a substrate; a mass section displaced along a first axis parallel to a principal plane of the substrate; a driving section configured to drive the mass section along the first axis; a fixed section fixed to the substrate; a first detecting section disposed in a first direction along a second axis crossing the first axis of the fixed section, coupled to the mass section, capable of turning around a third axis crossing the first axis and the second axis, and capable of being displaced along the third axis by a Coriolis force acting on a turning motion horizontal to the substrate; a second detecting section disposed in a second direction opposite to the first direction of the fixed section, coupled to the mass section, capable of turning around the third axis, and capable of being displaced in an opposite phase to the first detecting section along the third axis by the Coriolis force acting on the turning motion horizontal to the substrate; a first elastic section coupling the first detecting section and the fixed section; and a second elastic section coupling the second detecting section and the fixed section. The fixed section is disposed between an imaginary straight line connecting a center of gravity of the first detecting section and a center of gravity of the second detecting section and the mass section in a plan view.

An electronic device includes the gyro sensor.

A vehicle includes the gyro sensor.

DESCRIPTION OF EXEMPLARY EMBODIMENTS

1. First Embodiment

First, a gyro sensor 1 according to a first embodiment is explained with reference to FIGS. 1 to 4.

Figure 1:
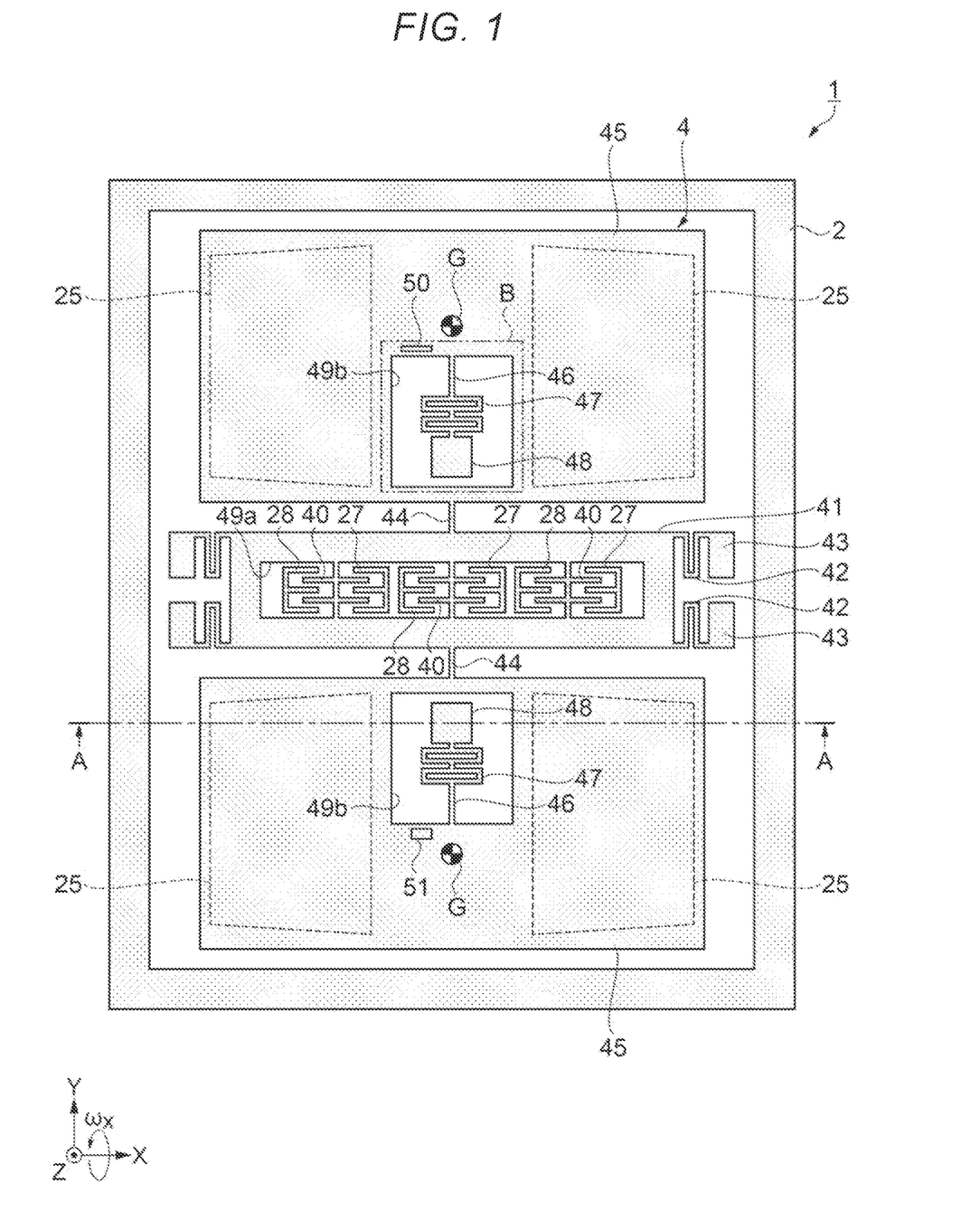
FIG. 1 is a plan view showing a schematic configuration of a gyro sensor according to a first embodiment.
Figure 2:
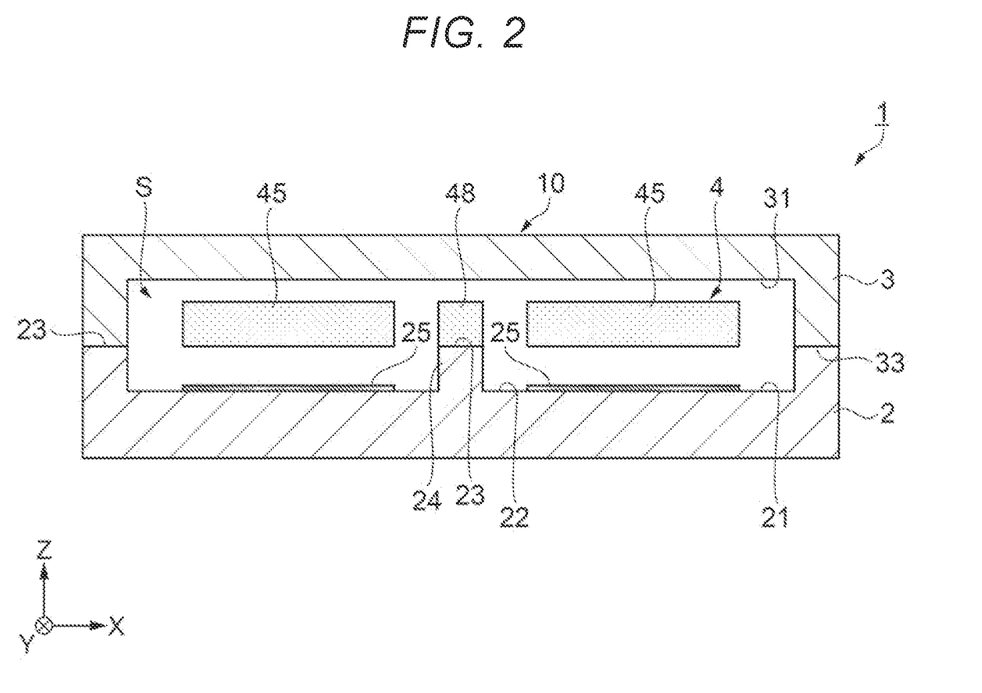
FIG. 2 is a sectional view taken along an A-A line in FIG. 1.
Figure 3:
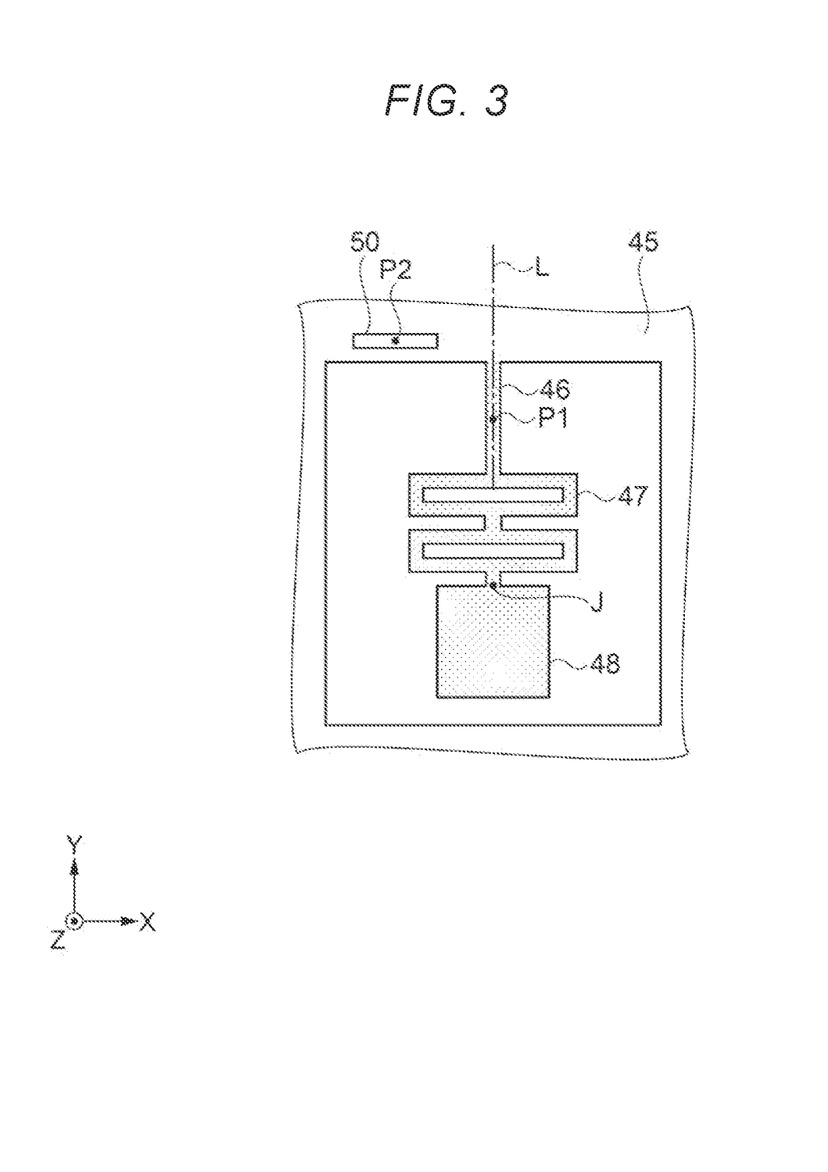
FIG. 3 is an enlarged view of a B part of FIG. 1.
Figure 4:
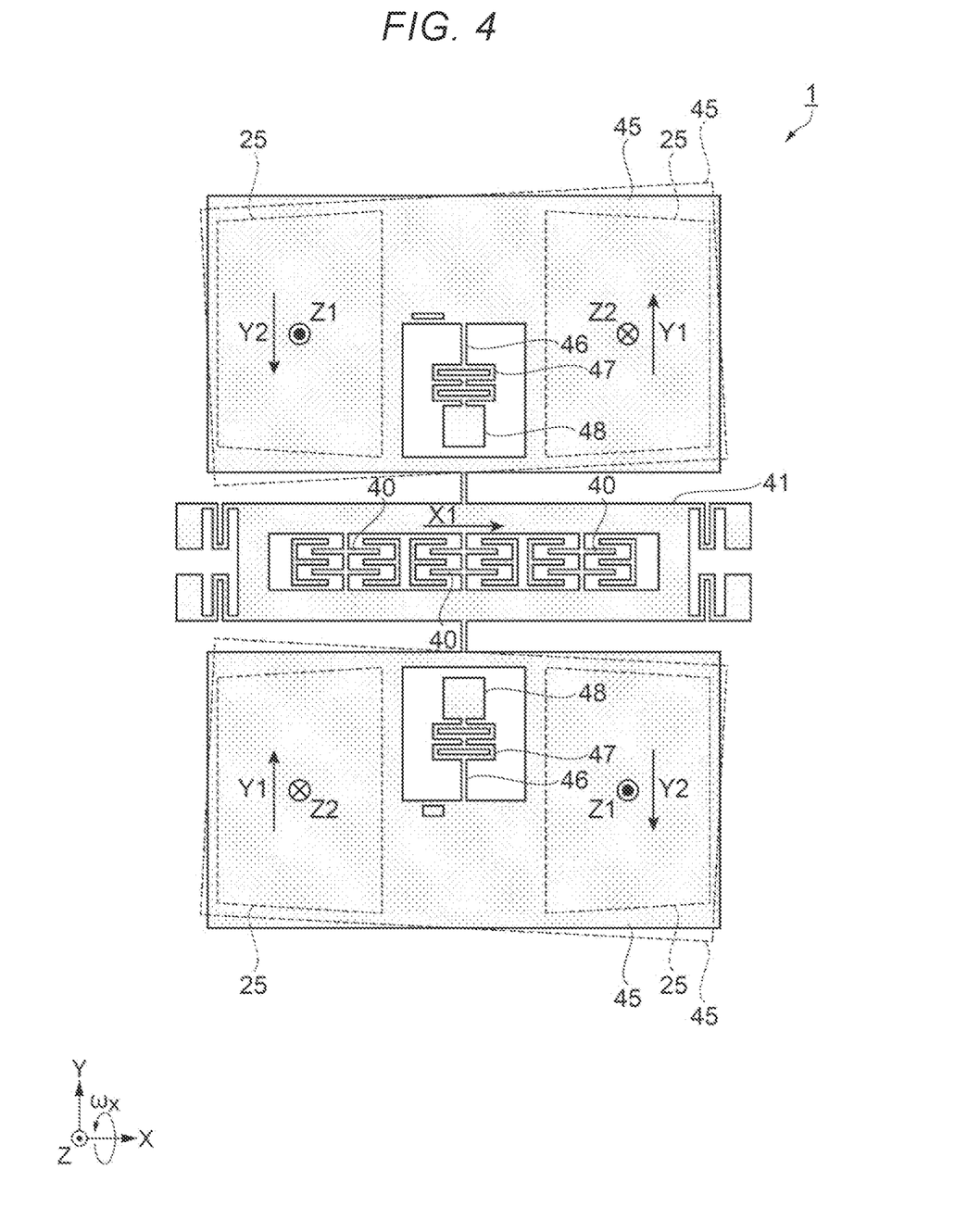
FIG. 4 is a plan view for explaining the operation of the gyro sensor.

FIG. 1 is a plan view showing the gyro sensor 1 according to the first embodiment. FIG. 2 is a sectional view taken along an A-A line in FIG. 1. FIG. 3 is an enlarged view of a B part of FIG. 1. FIG. 4 is a plan view for explaining the operation of the gyro sensor 1. In FIG. 1, a substrate 2 is schematically illustrated. Illustration of a lid section 3 is omitted. In the figures, a part of components are omitted for convenience of explanation. For example, a wire for extracting an electric signal and a protection structure called stopper that buffers excessively large vibration and shock are omitted. In the figures, dimension ratios of the components are different from actual dimension ratios in order to clearly show the components. An X axis, a Y axis, and a Z axis in the figures are coordinate axes orthogonal to one another. A direction along the X axis is represented as an "X direction". A direction along the Y axis is represented as a "Y direction". A direction along the Z axis is represented as a "Z direction". An arrow direction is a plus direction. In the following explanation in this embodiment, a first axis is the X axis, a second axis is the Z axis, and a third axis is the Y axis.

The gyro sensor 1 shown in FIG. 1 is an angular velocity sensor that can detect angular velocity around the X axis. The gyro sensor 1 includes, as shown in FIG. 2, an element section 4 and a package 10 housing the element section 4.

The package 10 includes a substrate 2 supporting the element section 4 and a lid section 3 joined to the substrate 2. A space S housing the element section 4 is formed between the substrate 2 and the lid section 3.

The substrate 2 and the lid section 3 are respectively formed in plate shapes and are disposed along an XY plane, which is a plane including the X axis and the Y axis.

A recess 21 opened in the upward direction, which is the element section 4 side, is provided on the substrate 2. A projecting section 24 projecting from a bottom surface 22 of the recess 21 is provided in the center of the recess 21. Fixed sections 48 explained below, which are parts of the element section 4, are fixed to a principal plane 23, which is the upper surface, of the projecting section 24. A plurality of not-shown projecting sections projecting from the bottom surface 22 are provided in the recess 21. Fixed sections 43 explained below, which are parts of the element section 4, and a part of fixed driving sections 27 and 28 are fixed to the recess 21. Fixed detecting sections 25, which generate capacitance between the fixed detecting sections 25 and detecting sections 45 explained below, which are parts of the element section 4, are provided on the bottom surface 22 of the recess 21.

A recess 31 opened in the downward direction, which is the substrate 2 side, is provided in the lid section 3. The lid section 3 is provided on the substrate 2 to cover the element section 4 in a noncontact manner. A lower surface 33 excluding the recess 31 is joined to the principal plane 23 surrounding the recess 21 of the substrate 2.

The space S is an airtight space formed by the recess 21 and the recess 31. The space S is in a decompressed state, at, for example, approximately $1 \times 10^{+2}$ Pa to $1 \times 10^{-2}$ Pa. Consequently, it is possible to improve detection sensitivity for angular velocity.

The constituent material of the substrate 2 is not particularly limited. However, it is preferable to use a material having insulation. Specifically, it is preferable to use a silicon material or a glass material having high resistance. It is preferable to use, for example, a glass material containing a fixed amount of alkali metal ions, for example, borosilicate glass such as Pyrex (registered trademark) glass. Consequently, when the element section 4 is formed using silicon as a main material, the substrate 2 and the element section 4 can be anodically bonded. By anodically bonding the substrate 2 and the element section 4, the element section 4 can be firmly fixed to the substrate 2. Accordingly, the gyro sensor 1 having high reliability in which peeling less easily occurs can be provided. Besides, the substrate 2 may be a quartz substrate, a quartz crystal substrate, or a SOI (Silicon on Insulator) substrate.

The constituent material of the lid section 3 is not particularly limited. The same material as the material of the substrate 2 explained above can be used.

A bonding method for the substrate 2 and the lid section 3 is different depending on the constituent materials of the substrate 2 and the lid section 3 and is not particularly limited. For example, a boding method by a bonding material such as an adhesive, a brazing material, or a glass frit material or a solid bonding method such as direct bonding or anodic bonding can be used. In particular, the glass frit material can satisfactorily secure an airtight space because the glass frit material flows out even on an uneven surface. In particular, in the case of the gyro sensor 1, since it is necessary to keep the airtight space in a decompressed state, the glass frit material is suitably used.

The element section 4 includes, as shown in FIG. 1, fixed sections 48 fixed to the substrate 2, a mass section 41 displaced in the X direction parallel to the principal plane 23 of the substrate 2, driving sections 40 that drive the mass section 41 in the X direction, detecting sections 45 coupled to the mass section 41, capable of rotating around the Z axis, and capable of being displaced in the Z direction by a Coriolis force acting on a turning motion horizontal to the substrate 2, and elastic sections 47 coupling the detecting sections 45 and the fixed sections 48. In this embodiment, the fixed sections 48, the detecting sections 45, and the elastic sections 47 are respectively pairs and are respectively symmetrically disposed on both sides of the mass section 41 and disposed, so to speak, line-symmetrically with respect to the Y axis.

The mass section 41 has a rectangular shape having a long side in the X direction and includes an opening section 49a in the center. A plurality of driving sections 40 coupled to the mass section 41 and a plurality of fixed driving sections 27 and 28 fixed to the substrate 2 are disposed in the opening section 49a.

The driving sections 40 and the fixed driving sections 27 and 28 respectively include pluralities of beam sections extending in the X direction and are disposed in a comb teeth shape. The fixed driving sections 27 are disposed on the plus side in the X direction of the driving sections 40 and disposed such that the respective beam sections of the driving sections 40 and the fixed driving sections 27 mesh with each other. The fixed driving sections 28 are disposed on the minus side in the X direction of the driving sections 40 and disposed such that the respective beam sections of the driving sections 40 and the fixed driving sections 28 mesh with each other.

The mass section 41 is coupled to four fixed sections 43, which are fixed to the substrate 2, respectively via four driving springs 42, both ends in the X direction of which have a folded shape. The driving springs 42 are formed to be bent or deformed in the X direction by an external force applied from the X direction. Accordingly, the driving springs 42 are capable of deforming the mass section 41 in the X direction.

A coupling spring 44 extending in the plus direction of the Y axis from an end portion at the opposite side of the opening section 49a on the plus side in the Y direction in the center in the X direction of the mass section 41 is provided. The detecting section 45 is coupled to an end portion at the opposite side of the mass section 41 side of the coupling spring 44. A coupling spring 44 extending in the minus direction of the Y axis from an end portion at the opposite side of the opening section 49a on the minus side in the Y direction in the center in the X direction of the mass section 41 is provided. The detecting section 45 is coupled to an end portion at the opposite side of the mass section 41 side of the coupling spring 44.

The detecting section 45 has a rectangular shape long in the X direction and includes an opening section 49b in a position closer to the mass section 41 than a center of gravity G of the detecting section 45 in the center in the X direction. In the opening section 49b, the fixed section 48 fixed to the substrate 2, the elastic section 47 coupled to the fixed section 48, and a joining section 46 extending in the Y direction from the elastic section 47 and joined to the detecting section 45 are disposed.

The elastic section 47 extends in the Y direction from the fixed section 48 while turning back respectively in the plus direction and the minus direction of the X direction and is coupled to the joining section 46. The elastic section 47 is formed to be bent or deformed in the X direction and the Y direction by external forces applied from the X direction and the Y direction.

The elastic section 47 is structured to be less easily deformed by an external force applied from the Z direction. Accordingly, when the mass section 41 is displaced in the X direction, the detecting section 45 is capable of turning or being displaced horizontally to the substrate 2 around a center axis J, which is a connecting point of the elastic section 47 and the fixed section 48 shown in FIG. 3.

The joining section 46 is disposed between the center of gravity G of the detecting section 45 and the mass section 41, extends in the Y direction from the elastic section 47, and is joined to the detecting section 45. Accordingly, the length from the fixed section 48 to the detecting section 45 can be increased. A rotation radius from the center axis J of the detecting section 45 can be increased. A displacement amount of an in-plane turning motion of the detecting section 45 involved in the driving of the driving section 40 can be increased.

The joining section 46 is formed to be twisted around the Y axis. Accordingly, when the detecting section 45 is performing the in-plane turning motion, a Coriolis force acting on the in-plane turning motion of the detecting section 45 is applied respectively in opposite direction to the plus side in the X direction of the detecting section 45 and the minus side in the X direction of the detecting section 45 when an angular velocity $\omega x$ around the X axis is applied to the detecting section 45. The detecting section 45 becomes capable of being displaced in the Z direction.

Specifically, when the plus side in the X direction of the detecting section 45 is displaced to the plus direction of the Z axis, the minus side in the X direction of the detecting section 45 is displaced to the minus direction of the Z axis. Conversely, when the plus side in the X direction of the detecting section 45 is displaced to the minus direction of the Z axis, the minus side in the X direction of the detecting section 45 is displaced to the plus direction of the Z axis. The detecting section 45 disposed in the plus direction of the Y axis and the detecting section 45 disposed in the minus direction of the Y axis are displaced in opposite phases.

The fixed detecting section 25 is provided to be separated from the detecting section 45 in a position opposed to the detecting section 45 on the bottom surface 22 of the recess 21 of the substrate 2. When the angular velocity $\omega x$ around the X axis is applied and the detecting section 45 is displaced in the Z direction, a change in an interval between the detecting section 45 and the fixed detecting section 25 is detected as a capacitance change. Consequently, the angular velocity $\omega x$ around the X axis can be detected.

The shape of the fixed detecting section 25 is a trapezoidal shape having an upper base and a lower base parallel to the Y direction. The fixed detecting section 25 is disposed such that the lower base long in the Y direction is on the fixed section 48 side. By disposing the fixed detecting section 25 in this way, in the rotating motion of the detecting section 45, since the detecting section 45 and the fixed detecting section 25 always overlap, a facing area of the detecting section 45 and the fixed detecting section 25 can be kept constant. Detection accuracy of the angular velocity $\omega x$ around the X axis can be maintained.

The fixed section 48 is disposed in the opening section 49b of the detecting section 45 and disposed between the center of gravity G of the detecting section 45 and between the elastic section 47 and the mass section 41 in the plan view. Accordingly, the elastic section 47 coupling the fixed section 48 and the detecting section 45 can be disposed in a direction away from the mass section 41 side. The rotation radius from the center axis J of the detecting section 45 can be increased. Therefore, the displacement amount of the in-plane turning motion of the detecting section 45 involved in the driving of the driving section 40 increases. When the angular velocity $\omega x$ around the X axis is applied, a displacement amount in the Z direction of the detecting section 45 is increased by an acting Coriolis force. Therefore, detection sensitivity can be improved.

The detecting sections 45 include grooves 50 and 51 disposed in positions closer to the elastic sections 47 than end portions on the opposite side of the mass section 41 side of the detecting sections 45. As shown in FIG. 3, the groove is disposed in a position where a center P2 in the X direction of the groove 50 does not overlap an extended line L along the Y axis passing a center P1 in the X direction of the joining section 46. Similarly, the groove 51 is disposed in a position where the center of the groove 51 does not overlap an extended line passing the center of the joining section 46. By providing the grooves 50 and 51 in the detecting sections 45 in this way, it is possible to reduce an increase in an unnecessary vibration component, which is a different vibration component other than driving vibration in the X-axis direction, a so-called quadrature signal involved in a machining error of the elastic section 47. In general, the machining error causing the unnecessary vibration component does not have symmetricalness with respect to a desired machining shape. Therefore, it is preferable to compensate for the machining error using the grooves 50 and 51 not having symmetricalness such as rotation symmetry, line symmetry, or point symmetry with respect to the X axis, the Y axis, and the Z axis as explained above.

The element section 4 explained above is collectively formed by patterning, with etching, a conductive silicon substrate doped with impurities such as phosphorus or boron.

As the constituent material of the fixed detecting sections 25, for example, aluminum, gold, platinum, ITO (Indium Tin Oxide), and ZnO (zinc oxide) can be used.

The gyro sensor 1 having the configuration explained above can detect the angular velocity $\omega x$ around the X axis as explained below.

First, when a driving voltage is applied between the driving sections 40 and the fixed driving sections 27 and 28 of the gyro sensor 1, electrostatic attraction, the intensity of which periodically changes, occurs between the fixed driving sections 27 and 28 and the driving sections 40. Consequently, as shown in FIG. 4, when the driving sections vibrate in the X direction while involving elastic deformation of the driving springs 42 and are displaced in a direction of an arrow X1, the two detecting sections 45 coupled to the mass section 41, which is displaced in the direction of the arrow X1 like the driving sections 40, perform a rotating motion in opposite phases around the Z axis centering on contact points of the fixed sections 48 and the elastic sections 47 to which the detecting sections 45 are respectively coupled.

In the detecting section 45 located on the plus side in the Y direction of the mass section 41, the plus side in the X direction of the detecting section 45 is displaced in an arrow Y1 direction and the minus side in the X direction of the detecting section 45 is displaced in an arrow Y2 direction. In FIG. 4, the displaced detecting section 45 is indicated by a broken line. Conversely, in the detecting section 45 located on the minus side in the Y direction of the mass section 41, the minus side in the X direction of the detecting section 45 is displaced in the arrow Y1 direction and the plus side in the X direction of the detecting section is displaced in an arrow Y2 direction. That is, the detecting section 45 located on the plus side in the Y direction of the mass section 41 rotates counterclockwise and the detecting section 45 located on the minus side in the Y direction of the mass section 41 rotates clockwise. When the driving sections 40 and the mass section 41 are displaced in the opposite direction of the arrow X1, the detecting section 45 located on the plus side in the Y direction of the mass section 41 rotates clockwise and the detecting section 45 located on the minus side in the Y direction of the mass section 41 rotates counterclockwise.

When the angular velocity $\omega x$ around the X axis is applied to the gyro sensor 1 in a state in which the detecting sections 45 are performing the in-plane turning motion around the Z axis in this way, a Coriolis force acts and the detecting sections 45 are displaced in the Z direction. At this time, in the detecting section 45 located on the plus side in the Y direction of the mass section 41, the plus side in the X direction of the detecting section 45 is displaced in an arrow Z2 direction and the minus side in the X direction of the detecting section 45 is displaced in an arrow Z1 direction. Conversely, in the detecting section 45 located on the minus side in the Y direction of the mass section 41, the minus side in the X direction of the detecting section 45 is displaced in the arrow Z2 direction and the plus side in the X direction of the detecting section 45 is displaced in the arrow Z1 direction.

When the driving sections 40 and the mass section 41 are displaced in the opposite direction of the arrow X1, in the detecting section 45 located on the plus side in the Y direction of the mass section 41, the plus side in the X direction of the detecting section 45 is displaced in the arrow Z1 direction and the minus side in the X direction of the detecting section 45 is displaced in the direction of the arrow Z2. Conversely, in the detecting section 45 located on the minus side in the Y direction of the mass section 41, the minus side in the X direction of the detecting section 45 is displaced in the arrow Z1 direction and the plus side in the X direction of the detecting section 45 is displaced in the arrow Z2 direction.

The detecting sections 45 are displaced in the Z direction in this way, whereby the distance between the detecting sections 45 and the fixed detecting sections 25 changes. According to the change of the distance, the capacitance between the detecting sections 45 and the fixed detecting sections 25 changes. The angular velocity $\omega x$ around the X axis applied to the gyro sensor 1 can be detected based on an amount of the change of the capacitance.

As explained above, in the gyro sensor 1 in this embodiment, the fixed sections 48 are disposed in the positions close to the mass section 41 and the elastic sections 47 coupling the fixed sections 48 and the detecting sections 45 are disposed in the direction away from the mass section 41 side. Consequently, the rotation radius from the center axis J of the detecting section 45 can be increased. Accordingly, when the displacement amount of the in-plane turning motion of the detecting sections 45 involved in the driving of the driving section 40 increases and the angular velocity $\omega x$ around the X axis is applied, the displacement amount in the Z direction of the detecting sections 45 is increased by the acting Coriolis force. Accordingly, the detection sensitivity of the gyro sensor 1 can be improved. Therefore, the gyro sensor 1 having high detection sensitivity can be obtained. Since the elastic sections 47 coupling the fixed sections 48 and the detecting sections 45 are disposed in the direction away from the mass section 41 side, stress concentration applied to the elastic sections 47 and the peripheries of the elastic sections 47 can be dispersed. Therefore, it is possible to prevent reliability from being deteriorated by a factor such as fatigue fracture. Accordingly, it is possible to provide the gyro sensor 1 having high performance and high reliability.

2. Second Embodiment

A gyro sensor 1a according to a second embodiment is explained with reference to FIG. 5.

Figure 5:
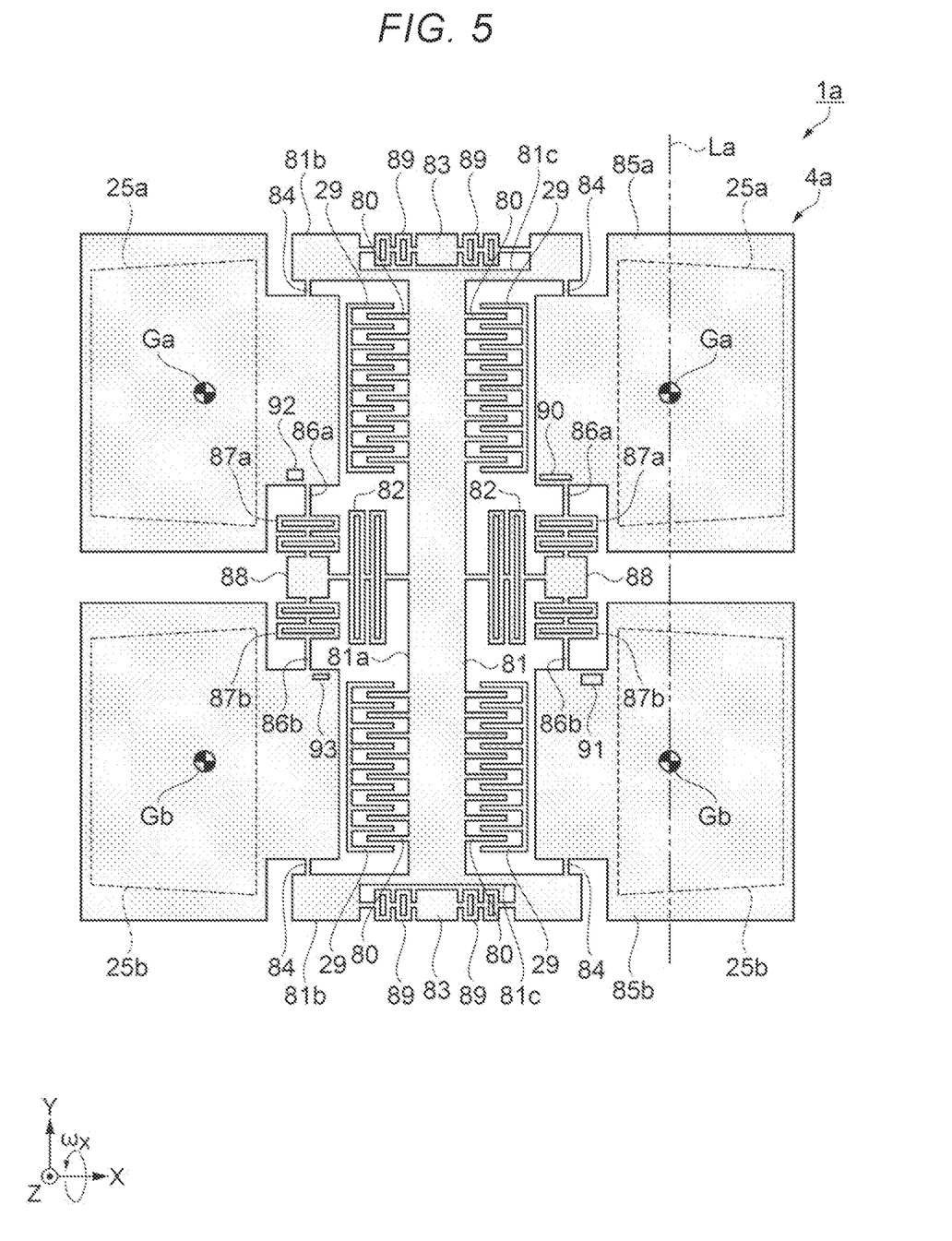
FIG. 5 is a plan view showing a schematic configuration of a gyro sensor according to a second embodiment.

FIG. 5 is a plan view showing a schematic configuration of the gyro sensor 1a according to the second embodiment. In FIG. 5, illustration of the substrate 2 and the lid section 3 is omitted. In FIG. 5, a part of components are omitted for convenience of explanation. Dimension ratios of the components are different from actual dimension ratios in order to clearly show the components. An X axis, a Y axis, and a Z axis in FIG. 5 are coordinate axes orthogonal to one another. A direction along the X axis is represented as an "X direction". A direction along the Y axis is represented as a "Y direction". A direction along the Z axis is represented as a "Z direction". An arrow direction is a plus direction. In the following explanation in this embodiment, a first axis is the X axis, a second axis is the Z axis, and a third axis is the Y axis. A first direction is a plus direction of the Y axis and a second direction is a minus direction of the Y axis.

Like the gyro sensor 1 in the first embodiment, the gyro sensor 1a in this embodiment is an angular velocity sensor that can detect angular velocity around the X axis. The gyro sensor 1a is different in the configuration of an element section 4a compared with the gyro sensor 1 in the first embodiment. The gyro sensor 1*a* includes four detecting sections 85*a* and 85*b* around a mass section 81.

As shown in FIG. 5, the element section 4*a* in this embodiment includes fixed sections 88 fixed to the substrate 2, the mass section 81 displaced in the X direction parallel to the principal plane 23 of the substrate 2, a plurality of driving sections 80 that drive the mass section 81 in the X direction, first detecting sections 85*a* disposed in the plus direction of the Y axis serving as the first direction of the fixed sections 88, coupled to the mass section 81, capable of turning around the Z axis, and capable of being displaced in the Z direction by a Coriolis force acting on a turning motion horizontal to the substrate 2, second detecting sections 85*b* disposed in the minus direction of the Y axis serving as a second direction of the fixed sections 88, coupled to the mass section 81, capable of turning around the Z axis, and capable of being displaced in the Z direction by the Coriolis force acting on the turning motion horizontal to the substrate 2, first elastic sections 87*a* coupling the first detecting sections 85*a* and the fixed sections 88, and second elastic sections 87*b* coupling the second detecting sections 85*b* and the fixed sections 88. In this embodiment, the fixed sections 88, the first detecting sections 85*a*, the second detecting sections 85*b*, the first elastic sections 87*a*, the second elastic sections 87*b*, and the two driving sections 80 are respectively pairs and are respectively symmetrically disposed on both sides of the mass section 81 and disposed, so to speak, line-symmetrically with respect to the Y axis.

The mass section 81 includes a rectangular square pillar section 81*a* having a long side in the Y direction and rectangular coupling sections 81*b* having long sides in the X direction provided at both ends in the Y direction of the square pillar section 81*a*. Driving springs 82 extending in the X direction while turning back respectively in the plus direction and the minus direction of the X direction and coupled to the fixed sections 88 are provided at both ends in the X direction in the center in the Y direction of the square pillar section 81*a*. Four driving sections 80 including comb teeth-like beams sections extending in the X direction are provided at both ends in the X direction of the square pillar section 81*a*.

Coupling springs 84 extending to the minus side in the Y direction and coupled to the first detecting sections 85*a* are respectively provided on both end sides in the X direction of the coupling section 81*b* disposed on the plus side in the Y direction of the square pillar section 81*a*. Coupling springs 84 extending to the plus side in the Y direction and coupled to the second detecting sections 85*b* are respectively provided on both end sides in the X direction of the coupling section 81*b* disposed on the minus side in the Y direction of the square pillar section 81*a*.

Cutout sections 81*c* opened on the opposite side of the square pillar section 81*a* side in the Y direction are provided in the coupling sections 81*b*. Fixed sections 83 are disposed in the centers in the X direction of the cutout sections 81*c*. Elastic springs 89 coupling the coupling sections 81*b* and the fixed sections 83 are provided at both ends in the X direction of the cutout sections 81*c*. The driving springs 82 and the elastic springs 89 are formed to be bent or deformed in the X direction by an external force applied from the X direction. Accordingly, the mass section 81 is capable of being displaced in the X direction.

Four fixed driving sections 29 including pluralities of comb teeth-like beam sections extending in the X direction and disposed to respectively mesh with the pluralities of beam sections of the driving sections 80 are respectively disposed on the plus side and the minus side in the X direction of the square pillar section 81*a*. A part of the fixed driving sections 29 are fixed to the substrate 2. When a driving voltage is applied between the driving sections 80 and the fixed driving sections 29, electrostatic attraction, the intensity of which periodically changes, occurs between the fixed driving sections 29 and the driving sections 80. Consequently, the driving sections 80 vibrate in the X direction while involving elastic deformation of the driving springs 82. The first detecting sections 85*a* and the second detecting sections 85*b* coupled to the mass section 81, which is displaced like the driving sections 80, perform an in-plane turning motion.

In the fixed sections 88 to which the driving springs 82 are coupled, the first elastic sections 87*a* and joining sections 86*a* extending in the Y direction from the first elastic sections 87*a* and joined to the first detecting sections 85*a* are coupled to the plus side in the Y direction and the second elastic sections 87*b* and joining sections 86*b* extending in the Y direction from the second elastic sections 87*b* and joined to the second detecting sections 85*b* are coupled to the minus side in the Y direction.

The first elastic sections 87*a* and the second elastic sections 87*b* extend in the Y direction from the fixed sections 88 while respectively turning back in the plus direction and the minus direction of the X direction and are respectively coupled to the joining sections 86*a* and 86*b*. The first elastic sections 87*a* and the second elastic sections 87*b* are formed to be bent or deformed in the X direction and the Y direction by external forces applied from the X direction and the Y direction. The first elastic sections 87*a* and the second elastic sections 87*b* are structured to be less easily deformed by an external force applied from the Z direction. Accordingly, when the mass section 81 is displaced in the X direction, the first detecting sections 85*a* are capable of turning or being displaced horizontally to the substrate 2 around center axes, which are connecting points of the first elastic sections 87*a* and the fixed sections 88, and the second detecting sections 85*b* are capable of turning or being displaced horizontally to the substrate 2 around center axes, which are connection points of the second elastic sections 87*b* and the fixed sections 88. When an external force in the X direction is applied and the first detecting sections 85*a* rotate clockwise, the second detecting sections 85*b* rotate counterclockwise. When the first detecting sections 85*a* rotate counterclockwise, the second detecting sections 85*b* rotate clockwise. The first detecting sections 85*a* and the second detecting sections 85*b* disposed on the plus side and the minus side in the Y direction respectively rotate in opposite phases.

The joining sections 86*a* and 86*b* are formed to be twisted around the Y axis. Accordingly, when the first detecting sections 85*a* and the second detecting sections 85*b* are performing an in-plane turning motion and the angular velocity $\omega x$ around the X axis is applied, Coriolis forces in opposite directions are respectively applied to the first detecting sections 85*a* and the second detecting sections 85*b*. The first detecting sections 85*a* and the second detecting sections 85*b* become capable of being displaced in the Z direction. Specifically, when the first detecting sections 85*a* are displaced in the plus direction of the Z axis, the second detecting sections 85*b* are displaced in the minus direction of the Z axis. Conversely, when the first detecting sections 85*a* are displaced in the minus direction of the Z axis, the second detecting sections 85*b* are displaced in the plus direction of the Z axis. The first detecting sections 85*a* and the second detecting sections 85*b* disposed on the plus side and the minus side in the Y direction are respectively displaced in opposite phases.

On the bottom surface 22 of the recess 21 of the substrate 2, first fixed detecting sections 25a are provided to be separated from the first detecting sections 85a in positions opposed to the first detecting sections 85a and second fixed detecting sections 25b are provided to be separated from the second detecting sections 85b in positions opposed to the second detecting section 85b. Accordingly, when the angular velocity ωx around the X axis is applied and the first detecting sections 85a and the second detecting sections 85b are displaced in the Z direction. Consequently, by detecting a change of an interval between the first fixed detecting sections 25a and the second fixed detecting sections 25b as a capacitance change, the angular velocity ωx around the X axis can be detected.

The fixed sections 88 are disposed between imaginary straight lines La connecting centers of gravity Ga of the first detecting sections 85a and centers of gravity Gb of the second detecting sections 85b and the mass section 81 in a plan view. Therefore, compared with when the fixed sections are disposed further on the opposite side of the mass section 81 than the imaginary straight lines La, a rotation radius of the first detecting sections 85a and the second detecting sections 85b can be increased. Accordingly, a displacement amount of an in-plane turning motion of the first detecting sections 85a and the second detecting sections 85b involved in the driving of the driving sections 80 increases. When the angular velocity ωx around the X axis is applied, a displacement amount in the Z direction of the first detecting sections 85a and the second detecting sections 85b are increased by an acting Coriolis force. Therefore, detection sensitivity can be improved.

Grooves 90, 91, 92, and 93 disposed in positions close to the joining sections 86a and 86b are provided in the first detecting sections 85a and the second detecting sections 85b. By providing the grooves 90, 91, 92, and 93 in the first detecting sections 85a and the second detecting sections 85b in this way, it is possible to reduce an increase in an unnecessary vibration component, which is a different vibration component other than driving vibration in the X-axis direction, a so-called quadrature signal involved in a machining error of the first elastic sections 87a and the second elastic sections 87b. As explained above, the machining error causing the unnecessary vibration component does not have symmetricalness with respect to a desired machining shape. Therefore, it is preferable to compensate for the machining error using the grooves 90, 91, 92, and 93 not having symmetricalness such as rotation symmetry, line symmetry, or point symmetry with respect to the X axis, the Y axis, and the Z axis as explained above.

As explained above, in the gyro sensor 1a in this embodiment, the fixed sections 88 are disposed between the imaginary straight lines La connecting the centers of gravity Ga of the first detecting sections 85a and the centers of gravity Gb of the second detecting sections 85b and the mass section 81. Therefore, the rotation radius of the first detecting sections 85a and the second detecting sections 85b can be increased. Accordingly, when the displacement amount of the in-plane turning motion of the first detecting sections 85a and the second detecting sections 85b involved in the driving of the driving sections 80 increases and the angular velocity ωx around the X axis is applied, since the displacement amount in the Z direction of the first detecting sections 85a and the second detecting sections 85b is increased by the acting Coriolis force, detection sensitivity can be improved. Therefore, the gyro sensor 1a having high detection sensitivity can be obtained. Since the rotation radius of the first detecting sections 85a and the second detecting sections 85b is increased, stress concentration applied to the joining sections 86a and 86b and the peripheries of the joining sections 86a and 86b can be dispersed. Therefore, it is possible to prevent reliability from being deteriorated by a factor such as fatigue fracture. Accordingly, it is possible to provide the gyro sensor 1 having high performance and high reliability.

3. Third Embodiment

Figure 6:
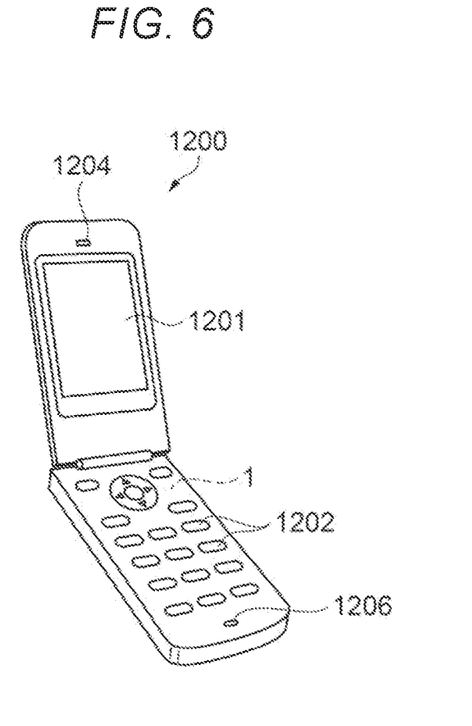
FIG. 6 is a perspective view showing the configuration of a cellular phone functioning as an electronic device including a gyro sensor according to a third embodiment.

A cellular phone 1200 is explained as an example of an electronic device including the gyro sensor 1 or 1a according to a third embodiment. In the following explanation, a configuration applied with the gyro sensor 1 is illustrated.

FIG. 6 is a perspective view showing the configuration of the cellular phone 1200 including the gyro sensor 1.

As shown in FIG. 6, the cellular phone 1200 includes a plurality of operation buttons 1202, an earpiece 1204, and a mouthpiece 1206. A display section 1201 is disposed between the operation button 1202 and the earpiece 1204.

The gyro sensor 1 is incorporated in such a cellular phone 1200.

Since such an electronic device includes the gyro sensor 1 explained above, the effects explained in the embodiments are reflected on the electronic device. The electronic device is excellent in performance.

Examples of the electronic device including the gyro sensor 1 or 1a explained above includes, besides the cellular phone 1200, an inkjet type discharging device such as an inkjet printer, laptop and mobile personal computers, a television, a digital still camera, a video camera, a video tape recorder, various navigation devices, a pager, an electronic notebook including an electronic notebook with a communication function, an electronic dictionary, an electronic calculator, an electronic game machine, a word processor, a work station, a videophone, a television monitor for crime prevention, electronic binoculars, a POS terminal, a fish finder, various measurement instruments, meters, a flight simulator, and medical equipment such as an electronic thermometer, a manometer, a blood glucose meter, an electrocardiographic device, an ultrasonic diagnostic device, and an electronic endoscope. In all the cases, these electronic devices include the gyro sensor 1 or 1a explained above. Therefore, the effects explained in the embodiments are reflected on the electronic devices. The electronic devices are excellent in performance.

4. Fourth Embodiment

Figure 7:
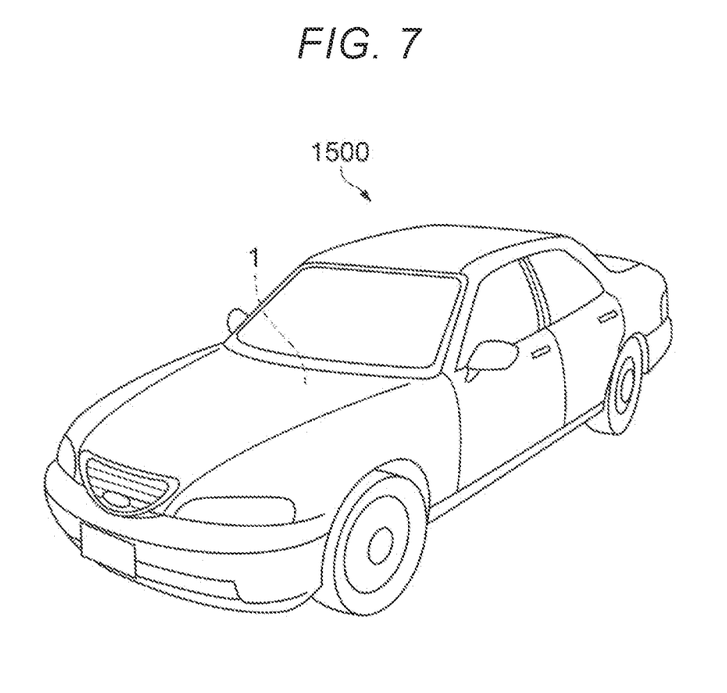
FIG. 7 is a perspective view showing the configuration of an automobile functioning as a vehicle including a gyro sensor according to a fourth embodiment.

An automobile 1500 is explained as an example of a vehicle including the gyro sensor 1 or 1a according to a fourth embodiment. In the following explanation, a configuration applied with the gyro sensor 1 is illustrated.

FIG. 7 is a perspective view showing the automobile 1500 including the gyro sensor 1.

As shown in FIG. 7, in the automobile 1500, the gyro sensor 1 is used as a posture detection sensor of a navigation device, a posture control device, or the like mounted on the automobile 1500.

Consequently, since the automobile 1500 includes the gyro sensor 1 explained above, the effects explained in the embodiments are reflected on the automobile 1500. The automobile 1500 is excellent in performance.

The gyro sensor 1 or 1a explained above is not limited to the automobile 1500 and can be suitably used as a posture detection sensor and the like of vehicles including a self-propelled robot, a self-propelled conveying apparatus, a train, a ship, an airplane, and an artificial satellite. In all the cases, the effects explained in the embodiments are reflected on the vehicles. Therefore, the vehicles excellent in performance can be provided.

Contents derived from the embodiments are described below.

A gyro sensor includes: a substrate; a fixed section fixed to the substrate; a mass section displaced along a first axis parallel to a principal plane of the substrate; a driving section configured to drive the mass section along the first axis; a detecting section coupled to the mass section, capable of turning around a second axis crossing the first axis, and capable of being displaced along the second axis by a Coriolis force acting on a turning motion horizontal to the substrate; and an elastic section coupling the detecting section and the fixed section. The fixed section is disposed between a center of gravity of the detecting section and the mass section in a plan view.

With this configuration, since the fixed section is disposed between the center of gravity of the detecting section and the mass section, the elastic section coupling the fixed section and the detecting section can be disposed in a direction away from the mass section side. A rotation radius of the detecting section can be increased. Accordingly, a displacement amount of an in-plane turning motion of the detecting section involved in the driving of the driving section increases. When an eternal force around the first axis is applied, a displacement amount along the second axis of the detecting section is increased by the acting Coriolis force. Therefore, detection sensitivity can be improved.

In the gyro sensor, the fixed section may be disposed between the elastic section and the mass section.

With this configuration, since the fixed section is disposed between the elastic section and the mass section, the fixed section can be disposed close to the mass section side. The elastic section can be disposed in a direction away from the mass section side on the opposite side of the mass section side of the fixed section. Accordingly, the rotation radius of the detecting section can be increased. The displacement amount of the in-plane turning motion of the detecting section involved in the driving of the driving section can be increased.

In the gyro sensor, a joining section extending along a third axis, which crosses the first axis and the second axis, from the detecting section and joining the elastic section and the detecting section may be disposed between the center of gravity of the detecting section and the mass section.

With this configuration, since the joining section joining the elastic section and the detecting section is disposed between the center of gravity of the detecting section and the mass section, the length from the fixed section to the detecting section which the joining section joins can be increased. Accordingly, the rotation radius of the detecting section can be further increased. The displacement amount of the in-plane turning motion of the detecting section involved in the driving of the driving section can be further increased.

In the gyro sensor, the detecting section may include a groove disposed in a position closer to the elastic section than an end portion at an opposite side of the mass section side of the detecting section.

With this configuration, since the groove is disposed in the position close to the elastic section of the detecting section, it is possible to reduce an increase in an unnecessary vibration component, which is a different vibration component other than driving vibration along the first axis, a so-called quadrature signal involved in a machining error of the elastic section.

In the gyro sensor, the groove may be disposed in a position where a center in the first axis direction of the groove does not overlap an extended line along the third axis passing a center in the first axis direction of the joining section.

With this configuration, since the detecting section turns around the second axis, by disposing the groove in the position not overlapping the extended line of the joining section, it is possible to reduce an increase in an unnecessary vibration component, which is a different vibration component other than turning vibration around the second axis, a so-called quadrature signal.

A gyro sensor includes: a substrate; a mass section displaced along a first axis parallel to a principal plane of the substrate; a driving section configured to drive the mass section along the first axis; a fixed section fixed to the substrate; a first detecting section disposed in a first direction along a second axis crossing the first axis of the fixed section, coupled to the mass section, capable of turning around a third axis crossing the first axis and the second axis, and capable of being displaced along the third axis by a Coriolis force acting on a turning motion horizontal to the substrate; a second detecting section disposed in a second direction opposite to the first direction of the fixed section, coupled to the mass section, capable of turning around the third axis, and capable of being displaced in an opposite phase to the first detecting section along the third axis by the Coriolis force acting on the turning motion horizontal to the substrate; a first elastic section coupling the first detecting section and the fixed section; and a second elastic section coupling the second detecting section and the fixed section. The fixed section is disposed between an imaginary straight line coupling a center of gravity of the first detecting section and a center of gravity of the second detecting section and the mass section in a plan view.

With this configuration, since the fixed section is disposed between the imaginary straight line connecting the center of gravity of the first detecting section and the center of gravity of the second detecting section and the mass section, compared with when the fixed section is disposed on further on the opposite side of the mass section than the imaginary straight line, a rotation radius of the first detecting section and the second detecting section can be increased. Accordingly, a displacement amount of an in-plane turning motion of the first detecting section and the second detecting section involved in the driving of the driving section increases. When an eternal force around the first axis is applied, a displacement amount along the second axis of the first detecting section and the second detecting section is increased by the acting Coriolis force. Therefore, detection sensitivity can be improved.

An electronic device includes the gyro sensor.

With this configuration, since the electronic device includes the gyro sensor having a high sensitivity characteristic and high accuracy, the electronic device having high performance can be provided.

A vehicle includes the gyro sensor.

With this configuration, since the vehicle includes the gyro sensor having a high sensitivity characteristic and high accuracy, the vehicle having high performance can be provided.

What is claimed is:
1. A gyro sensor comprising:
three mutually orthogonal axes being defined as an X-axis, a Y-axis, and a Z-axis;
a substrate; and an element unit that is supported on the upper surface of the substrate located on the plus side of the Z axis and detects an angular velocity based on a change in capacitance, wherein the element unit comprises:
- a fixed section fixed to the upper surface of the substrate;
- a mass section configured to be displaced in an X-axis direction along the X-axis parallel to the upper surface of the substrate;
- a driving section that drives the mass section in the X-axis direction;
- a first detecting section that is connected to the mass section and is configured to be displaced in a Z-axis direction along the Z-axis;
- a second detecting section that is connected to the mass section and is configured to be displaced in the Z-axis direction;
- a first elastic section connecting the first detection section and the fixed section; and
- a second elastic section connecting the second detection section and the fixed section.

2. The gyro sensor according to claim 1, wherein the first detecting section and the second detecting section rotate in opposite phases along a plane including the X-axis and the Y-axis.

3. The gyro sensor according to claim 1, wherein in a plan view from the Z-axis direction, the fixed section is arranged between the first detecting section and the second detecting section.

4. The gyro sensor according to claim 1, wherein the first detecting section is arranged on a plus side of the Y axis; and
the second detecting section is arranged on a minus side of the Y axis.

5. The gyro sensor according to claim 1, wherein the element part comprises:
- a first joining section connecting the first detecting section and the first elastic section; and
- a second joining section connecting the second detecting section and the second elastic section.

6. The gyro sensor according to claim 4, wherein a first groove is provided on the connection side of the first detecting section with the first joining section.

7. The gyro sensor according to claim 4, wherein a second groove is provided on the connection side of the second detecting section with the second joining section.

8. The gyro sensor according to claim 1, wherein in a plan view from the Z-axis direction, the fixed section is located between an imaginary straight line connecting a center of gravity of the first detecting section and a center of gravity of the second detecting section and the mass section.

9. The gyro sensor according to claim 1, wherein the first elastic section extends from the fixed section to the first detecting section in the Y-axis direction along the Y-axis, and has a folded shape that is folded from the plus direction to the minus direction of the X axis.

10. The gyro sensor according to claim 1, wherein the second elastic section extends from the fixed section to the second detecting section in the Y-axis direction along the Y-axis, and has a folded shape that is folded from the plus direction to the minus direction of the X axis.

11. An electronic device comprising the gyro sensor according to claim 1.

12. A vehicle comprising the gyro sensor according to claim 1.

* * * * *